(12) United States Patent
Covell et al.

(10) Patent No.: US 8,745,074 B1
(45) Date of Patent: Jun. 3, 2014

(54) METHOD AND SYSTEM FOR EVALUATING CONTENT VIA A COMPUTER NETWORK

(75) Inventors: Michele Covell, Palo Alto, CA (US);
Shumeet Baluja, Leesburg, VA (US);
Josh Sacks, Woodside, CA (US);
Yuchen Wu, Fremont, CA (US)

(73) Assignee: Google Inc., Mountain View, CA (US)

( * ) Notice: Subject to any disclaimer, the term of this patent is extended or adjusted under 35 U.S.C. 154(b) by 78 days.

(21) Appl. No.: 13/619,467

(22) Filed: Sep. 14, 2012

(51) Int. Cl.
*G06F 17/30* (2006.01)
*G06F 7/00* (2006.01)

(52) U.S. Cl.
USPC .......................................................... 707/758

(58) Field of Classification Search
CPC ...................... G06F 17/30867; G06F 17/30864
USPC ........................................................ 707/758
See application file for complete search history.

(56) References Cited

U.S. PATENT DOCUMENTS

| | | | |
|---|---|---|---|
| 7,248,832 B2 * | 7/2007 | Ikeda et al. | 455/39 |
| 7,734,632 B2 * | 6/2010 | Wang | 707/749 |
| 7,970,721 B2 | 6/2011 | Leskovec et al. | |
| 8,589,378 B2 * | 11/2013 | Liu et al. | 707/708 |
| 2005/0071328 A1 * | 3/2005 | Lawrence | 707/3 |
| 2009/0171763 A1 | 7/2009 | Dong et al. | |
| 2009/0204599 A1 * | 8/2009 | Morris et al. | 707/5 |
| 2010/0030648 A1 | 2/2010 | Manolescu et al. | |
| 2011/0010243 A1 | 1/2011 | Wilburn et al. | |
| 2012/0010996 A1 | 1/2012 | Horvitz et al. | |
| 2012/0191539 A1 * | 7/2012 | Guha et al. | 705/14.52 |

* cited by examiner

*Primary Examiner* — Kuen Lu
(74) *Attorney, Agent, or Firm* — Foley and Lardner LLP; John D. Lanza

(57) ABSTRACT

Systems and methods of evaluating information via a computer network are provided. A content group can be identified, and each item of the content group can be associated with a vector indicating at least one user interest category of users exposed to the item. The vectors of each item can be evaluated to generate a first nearest neighbor list of each item of the content group. The nearest neighbor list of a first item can be compared with the nearest neighbor list of a second item. Based on a result of the comparison, the first and second items can be associated in a cluster.

20 Claims, 3 Drawing Sheets

METHOD AND SYSTEM FOR EVALUATING CONTENT VIA A COMPUTER NETWORK

BACKGROUND

In an Internet based content delivery system, content can be directed towards users who are likely to be interested in the content. For example, content can be displayed on a search engine results page in response to a search query from a user. The user can click on a content link to access a webpage associated with the content.

SUMMARY OF THE INVENTION

At least one aspect is directed to a method of evaluating information via a computer network. The method identifies a first content group. Items of the first content group each have a vector indicating at least one user interest category of users exposed to at least one item of the content group. The method evaluates the vector of each item of the first content group to generate a first nearest neighbor list of the first content group. The method compares the first nearest neighbor list of the first content group with a second nearest neighbor list of a second content group. Based on a result of the comparison, the method associates the first content group with the second content group in a cluster.

At least one aspect is directed to a system of evaluating information via a computer network. The system includes at least one of a memory unit configured to store processor executable instructions and a processor configured to execute the processor executable instructions to identify a first content group. Each item of the first content group can have a vector. The vector of each item of the first content group can indicate at least one user interest category of users exposed to at least one item of the first content group. The data processing system can evaluate the vector of each item of the first content group to generate a first nearest neighbor list of the first content group. The data processing system can compare the first nearest neighbor list of the first content group with a second nearest neighbor list of a second content group. The data processing system can associate the first content group with the second content group in a cluster based on a result of the comparison.

At least one aspect is directed to a computer readable storage medium having instructions encoded thereon that when executed by at least one processor cause the at least one processor to perform a method to evaluate information obtained via a computer network. The method can include identifying a first content group, each item of the first content group having a vector. The vector of each item of the first content group indicates at least one user interest category of users exposed to at least one item of the first content group. The method can include evaluating the vector of each item of the first content group to generate a first nearest neighbor list of the first content group. The method can include comparing the first nearest neighbor list of the first content group with a second nearest neighbor list of a second content group. The method can include grouping the first content group with the second content group in a cluster based on the comparison.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
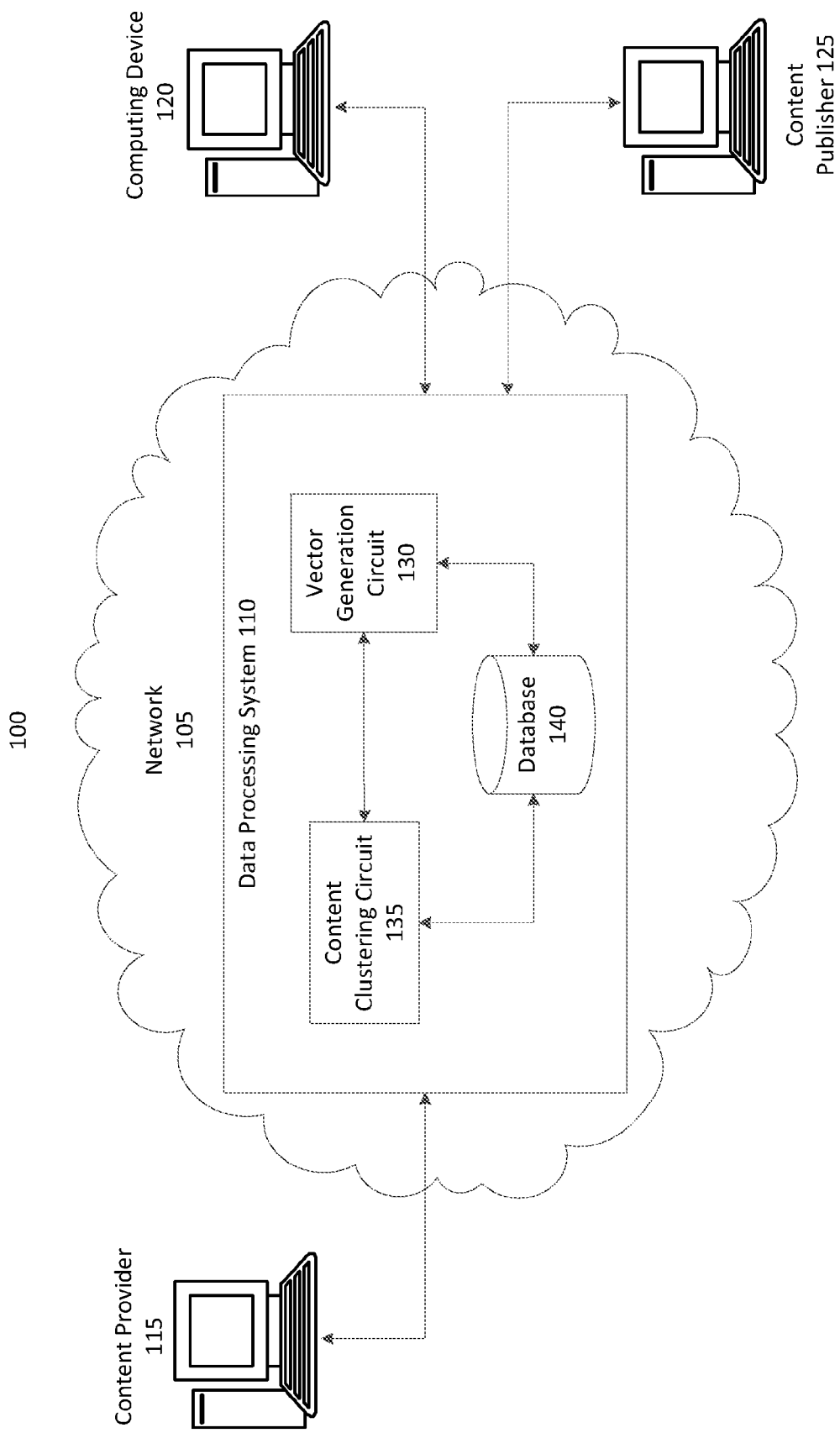
FIG. 1 is a block diagram depicting an example environment of a system to evaluate information via a computer network, according to an illustrative implementation.

Following below are more detailed descriptions of various concepts related to, and implementations of, methods, apparatuses, and systems for evaluating content via a computer network. The various concepts introduced above and discussed in greater detail below may be implemented in any of numerous ways, as the described concepts are not limited to any particular manner of implementation. Examples of specific implementations and applications are provided primarily for illustrative purposes.

The systems and methods described herein cluster online content by creating nearest neighbor lists for each content item, such as an ad, and comparing the nearest neighbor lists. In one implementation, each item of a group of content items has one nearest neighbor list. The nearest neighbor list indicates an order of similarity of other items of other content groups relative to a first selected item. For example, a set of 500 content groups can have 500 ads or other content items (e.g., there is one item per group in this example). The nearest neighbor list of group number 1 ranks group numbers 2-499 in an order of similarity with respect to the item in group number 1. The nearest neighbor list of group number 2 ranks group number 1 and numbers 3-499 in an order of similarity with respect to group number 2. This process can repeat, so that a nearest neighbor list for all other content groups can be generated for each content group, e.g. for all 500 content groups, resulting in a distance-sorted list of 499 content groups relative to the $500^{th}$ group.

For each item in the content group, a vector can be generated. The vector generally indicates at least one user interest category associated with the content item. A content item can have any number of user interests associated with it, and some user interests can be stronger or more widespread among users than others. The vector for a content item can indicate all of these interests as well as their relative strength or weight. A nearest neighbor list for an item can be created by comparing the user interest vectors of that item and all other items. For a given content item, the other items with similar vectors can be considered more closely related than items whose vectors are more dissimilar. These inferred similarity lists can be combined for the items in each group to create nearest-neighbor lists for each content group, providing a ranking to all other content groups by similarity of the user-interest vectors to the one content group being described by the current nearest-neighbor list.

Nearest neighbor lists can be compared to identify the two content groups whose nearest neighbor lists are most similar. In one implementation, the content groups whose lists are the most similar are determined to be similar to each other, and those two groups can be clustered together, with the composite group replacing the two clustered groups. The process can be repeated to reduce the number of content groups. Clusters can facilitate content placement on information resources. For example, an ad placement system can use the clusters to select ads or other content for display on a web page or website.

In some implementations, the vector of each item of the content group is evaluated to generate a nearest neighbor list for each item of the content group with the items in all other content groups. These nearest neighbor lists for items in the content group can be combined to generate nearest neighbor lists for each content group relative to all other content groups. A first nearest neighbor list of a first content group can be compared with the nearest neighbor lists of all other content groups, to determine which other content group has the most similar ordering of neighbor groups. In this example, all content groups can be considered in the role of the first content group. Based on a result of these comparisons, a first content group can be selected from the available set of content groups and associated with its most similar, by neighbor list ordering, second content group. These two content groups can be put into a single cluster forming a new content group that contains and replaces the first and second content groups.

FIG. 1 illustrates an example system 100 for evaluating content via at least one computer network, such as network 105. The network 105 can include computer networks such as the Internet, personal, local, metro, wide or other area networks, intranets, satellite networks, and other communication networks such as voice or data mobile phone communication networks. The system 100 can also include at least one data processing system 110. The data processing system 110 can include at least one processor or logic device to communicate via the network 105, for example with at least one content provider 115, at least one user computing device 120, and at least one content publisher 125, and at least one database 140 such as a memory unit configured to store data, information, or instructions that can be accessed or retrieved by the data processing system.

The content provider 115 can include a server or computing device to make available content such as advertisements, applications, keywords, index terms, selection criteria, or other data for delivery via the network 105 to the computing device 120. The data processing system 110 can detect a request for content from the computing device 120, and can respond by delivering content for display at the computing device 120. The content publisher 125 can include a website operator having a web server. In one implementation, the computing device 120 communicates with the content publisher 125 to request display of a webpage created by the content publisher 125 at the computing device 120.

The data processing system 110 can include at least one server. For example, the data processing system 110 can include a plurality of servers located in at least one data center. In one implementation, the data processing system 110 includes a content placement system. The data processing system 110 can also include at least one vector generation module 130, at least one content clustering module 135, and at least one database 140. The vector generation module 130 and the content clustering module 135 can each include at least one processing unit or other logic device such as programmable logic arrays, logic circuits, circuits, or other application specific integrated circuits configured to execute computer readable instructions and to communicate with the database 140. The vector generation module 130 and the content clustering module 135 can be separate components, a single component, or part of the data processing system 110. The vector generation module 130 and the content clustering module 135 can each include an engine or module having a logic device (e.g., a processor) configured to execute the implementations described herein. In one implementation, the database 140 includes at least one memory unit having processor executable instructions that, when executed by a processor of the data processing system 110, can cause the processor to implement the operations described herein.

The data processing system 110 can receive information from the content provider 115 via the network 105. For example, the content provider 115 (e.g., an advertiser) can include a computing device operated by a person, a merchant, or a representative of a company to provide content such as ads to the data processing system 110 for display at the computing device 120. The data processing system 110 can receive multiple content items from the content provider 115. The data processing system 110 can receive content configured for display at the computing device 120 from any number of content providers 115. An ad or other content item can be displayed at least once on computing device 120.

In one implementation, the vector generation module 130 creates a vector associated with the content. The vector can represent user interest categories associated with the content. The vector generation module 130 can determine a user interest category by examining user activity of the computing device 120. For example, the interests of a user of computing device 120 can be determined by the vector generation module 130 based on a search query entered into a search engine by the user or a website visited by the user.

In some implementations, the vector generation module 130 determines a vector for each content item of a group of content items, e.g., determines a vector for each ad of an ad group. A vector associated with a content item generally describes a distribution of associated user interest categories and can include information about the relative frequency of interests of users exposed to the content item, such as users who accessed, viewed, searched for, or clicked a content item on a web page using the computing device 120. For example, the content item can include an ad for a tropical beach vacation. The data processing system 110 can identify computing devices 120 that have displayed or clicked on the tropical beach vacation ad, and can determine user interest categories associated with users who viewed the tropical beach vacation ad via respective computing devices 120. For example, the data processing system 110 can determine that anonymous users clicking on this ad have an interest in scuba diving, honeymoons, or sea turtle migration patterns. Some of these user interest categories may be stronger or more widespread among users than others. From the data indicating user interest categories, the vector generation module 130 can generate a vector (or histogram) indicating these user categories and their relative strength or weight. For example, the query lists generated from each user computing device 120 of the users that visited current content can be run through a Bayesian classifier network to give topics (e.g., sea-turtle migration) for those searches. These topic weight vectors can, for example, be added across all the queries of all the users that viewed of visited the content (e.g., ad) being described, given a user-interest vector for that content (e.g., ad).

The data processing system 110 can collect data (e.g., using cookies) from users anonymously, such that no data identifying an individual user to an interest is collected or maintained. The data processing system 110 can require affirmative consent from the user of computing device 120 before any information is collected from the user. The user can opt-in to allow collection of cookies or other data, and can opt-out to prohibit this collection. The data processing system 110 can use this data to identify user interest categories and their relative strength or weight, indicated for example by vectors. In one implementation, the data processing system 110 determines user interest categories based on search terms (e.g., keywords) entered into a search engine during a previous time period and originating, for example, from the computing device 120.

The vector generation module 130 can determine that some interests are more strongly associated with the content than are other interests. For instance, in the example above, the vector generation module 130 can determine that among users who viewed the ad, twice as many were interested in scuba diving as were interested in honeymoons. The vector created by the vector generation module 130 for this content can then indicate these interests as well as the relative strengths or weights of the interests. In some implementations, a vector created by the vector generation module 130 can be represented as a histogram for each user interest associated with the content item. The vector can be represented using any computer data structure, such as an array, a vector, or a list, for example.

The vector generation module 130 can create a vector for each item in a group of content items identified by the data processing system 110. The group can include any number of content items such as ads. The data processing system 110 can evaluate the vectors to generate a nearest neighbor list for each content item in the group and combine these to create a nearest neighbor list for the content group as a whole. Alternately, the user interest vectors for the items in the content group can be combined first and then a nearest neighbor list of the remaining content groups can be created from this combined user-interest vector. A nearest neighbor list for a base item can be an ordered list of all of the other items in other content groups, sorted by their degree of relatedness to the base item or the nearest neighbor list can be an ordered list of other content groups based on a combination of evidence provided by all the items contained in these other content groups. To determine a degree of relatedness for two items (or groups), the data processing system 110 can compare the vectors for the items. If the vectors have a high degree of similarity, then the data processing system 110 can determine that the content items themselves may have a high degree of similarity. In one implementation, the first item in a nearest neighbor list can be the item whose vector is most similar to the vector of the base item, while the last item in the nearest neighbor list can be the item whose vector is least similar to the vector of the base item.

In some implementations, the data processing system 110 evaluates the vectors of the content items (e.g., ads) of a content group (e.g., a group of ads) to determine the nearest neighbor list for a content item (e.g., of one ad) of the content group. For example, each content item of the content group may have a user interest vector, and the data processing system 110 can compare the user interest vector of a first content item with user interest vectors of the other content items of other content groups to rank the other content groups relative to the first content item. The nearest neighbor list indicates the results of this ranking. For example, the vector generation circuit 110 can implement a cosine distance function to compare two or more user interest vectors to identify a degree of similarity between the two vectors and then sort the containing content groups according to increasing minimum, maximum, or average distance to the items in each group.

In one implementation, the data processing system 110 implements an $N^2$ or N-pick-2 matrix operation on two vectors that returns a number that represents a distance between (or degree of similarity of) every pair of the vectors and their associated content items. In one example, a lower number on a distance measure indicates a closer relationship between vectors or content items. The numbers can be ordered, for each selected content item, to determine the relative distance, or relative level of similarity of the content items from other content groups relative to the selected content item of any group, forming the nearest neighbor list for the selected content item. In one implementation, this process repeats until a nearest neighbor list is created for each content item of the content group and those lists are then combined to form the nearest-neighbor ordering of the content group itself, ordering all other content groups relative to the selected group.

For example, there may by five content groups, each with a single content item: Group 1 has item A with an associated user-interest vector of 50% scuba diving and 40% boating, and 10% swimwear; Group 2 has item B with an associated user-interest vector of 40% surfing, 30% boating, 30% fishing; Group 3 has item C with an associated user-interest vector of 40% boating, 20% swimwear, 20% shoes, 20% bicycling; Group 4 has item D with an associated user-interest vector of 50% shoes, 25% swimwear, 25% hair products; Group 5 has item E with an associated user-interest-vector of 50% bicycling, 50% shoes. In this example, data processing system 110 uses one minus the dot product of the unit-normalized vectors to determine distance between the items (and thereby their containing groups). Using that measure, Group 1 and 2 would have a distance of 0.88 (=1−(0.4*0.3 for boating)); Group 1 and 3 would have a distance of 0.82 (=1−(0.4*0.4 for boating)−(0.1*0.2 for swimwear)); Group 1 and 4 would have a distance of 0.975 (=1−(0.1*0.25 for swimwear)); Group 1 and 5 would have a distance of 1 (=no shared interest); Group 2 and 3 would have a distance of 0.88 (=1−(0.3*0.4 for boating)); Group 2 and 4 would have a distance of 1 (=no shared interest); Group 2 and 5 would have a distance of 1 (=no shared interest); Group 3 and 4 would have a distance of 0.95 (=1−(0.2*0.25 for swimwear)); Group 3 and 5 would have a distance of 0.8 (=1−(0.2*0.5 for biking)−(0.2*0.5 for shoes); and Group 4 and 5 would have a distance of 0.75 (=1−(0.5*0.5 for shoes). Using these distances, the nearest neighbor list for Group 1 could be represented as [1 2.5 1 4 2.5] where the i'th entry is the rank (e.g., the ordinal number of at entry in a sorted distance list) of the i'th group, using fractional ranks in the event of ties (e.g. since Group 2 and 5 are both the same distance from Group 1 and there is one Group in front of them, they are both given rank 2.5 instead of rank 2 and 3) and where the self rank (the rank of the selected group itself) is marked as 1 (same as the rank of its closest neighbor. Continuing with our example, Group 2 would have a nearest neighbor list of [1.5 1 1.5 3.5 3.5]; Group 3 of [2 3 1 4 1]; Group 4 of [3 4 2 1 1]; and Group 5 of [3.5 3.5 2 1 1].

In one implementation, the data processing system 110 can compare the nearest neighbor lists of each of the content groups to identify the two (or other number of) content groups having the most similar nearest neighbor lists using the sum of the absolute difference in the rank of each entry divided by the minimum rank for that entry across the two lists. This has the characteristic of paying less attention to the variations seen in entries that are low on both content groups' rankings. In the previous example, Group 1 and 2 have a distance between their nearest neighbor lists of 3.04286 (=|1−1.5|/1+

|2.5−1|/1+|1−1.5|/1+|4−3.5|/3.5+|2.5−3.5|/2.5); Group 1 and 3 a distance of 2.7 (=|1−2|/1+|2.5−3|/2.5+|1−1|/1+|4−4|/4+|2.5−1|/1); Group 1 and 4 a distance of 8.1 (=|1−3|/1+|2.5−4|/2.5+|1−2|/1+|4−1|/1+|2.5−1|/1); Group 1 and 5 a distance of 8.4 (=|1−3.5|/1+|2.5−3.5|/2.5+|1−2|/1+|4−1|/1+|2.5−1|/1); Group 2 and 3 a distance of 5.47619 (=|1.5−2|/1.5+|1−3|/1+|1.5−1|/1+|3.5−4|/3.5+|3.5−1|/1)); Group 2 and 4 a distance of 9.3333 (=|1.5−3|/1.5+|1−4|/1+|1.5−2|/1.5+|3.5−1|/1+|3.5−1|/1)); Group 2 and 5 a distance of 8.3333 (=|1.5−3.5|/2+|1−3.5|/1+|1.5−2|/1.5+|3.5 −1|/1+|3.5−1|/1); Group 3 and 4 a distance of 4.83333 (=|2−3|/2+|3−4|/3+|1−2|/+|4−1|/1+|1|−−1|/1); Group 3 and 5 a distance of 4.91667 (=|2−3.5|/2+≡3−3.5|/3+|1−2|/1+|4−1−/1+|1−1|/1); Group 4 and 5 a distance of 0.3095 (=|3−3.5|/3+|4−3.5|/3.5+|2−2|/2+|1−1|/1). In this example, the data processing system 110 clusters Groups 4 and 5 together, since these groups have the smallest distance under this measure.

In one implementation, the data processing system 110 can compare the nearest neighbor lists of each of the content groups to identify the two (or other number of) content groups having the most similar nearest neighbor lists, or which nearest neighbor lists have a degree of similarity above a threshold level, where similarity is instead measured by edit distance. For example, the nearest neighbor lists can be represented as a vector of content group identifiers, sorted by the neighbor distance order, and the data processing system 110 can execute an edit distance operation to determine a degree of similarity between nearest neighbor lists. In this example, the edit distance operation, executed by the data processing system 110 can compare two vectors of distance-ordered neighbors to determine what or how many operations (e.g., insertions or deletions) would be needed to turn one neighbor vector into the other vector. The pair of vectors with the fewest number of operations needed indicates which two vectors are the most similar to each other. These two vectors can be clustered, e.g., when the degree of similarity is above a threshold level. The content clustering module 135 can identify the two or more content items corresponding to the most similar nearest neighbor lists, and can cluster these content groups together.

To compute this nearest neighbor list distance measure, the above representation of the nearest neighbor lists can be inverted, and the group number can be sorted from closest to furthest (instead of leaving the groups unsorted by annotating them with their ordinal rank). In this example, the data vector for Group 1 would become [3 {2 5} {2 5} 4] using a repeated set entry to represent 'ties' (i.e., group numbers that are at the same distance from the group being described). Group 2 in this example has a data vector [{1 3} {1 3} {4 5} {4 5}]; Group 3[5 1 2 4]; Group 4 of [5 3 1 2] and Group 5 of [4 3 {1 2} {1 2}]. Using insertions and deletions, and considering the pair of group identifiers being considered for grouping as being a match without edits, the data processing system 110 can determine that Groups 1 and 2 have an edit distance of 0 (using [3 2 5 4] for Group 1 and [3 1 5 4] for Group 2); Groups 1 and 3 have an edit distance of 2 (using [3 5 2 4] for Group 1, with 2 operations needed to reorder the first two entries); Groups 1 and 4 have an edit distance of 4 (using [3 5 2 4] for Group 1); Groups 1 and 5 have an edit distance of 2 (using [3 5 2 4] for Group 1 and [4 3 1 2] for Group 5); Groups 2 and 3 have an edit distance of 2 (using [1 3 5 4] for Group 2); Groups 2 and 4 have an edit distance of 2 (using [3 1 5 4] for Group 2); Groups 2 and have an edit distance of 2 (using [3 1 5 4] for Group 2 and [4 3 1 2] for Group 5); Groups 3 and 4 have an edit distance of 2; Groups 3 and 5 have an edit distance of 2 (using [4 3 1 2] for Group 5); Groups 4 and 5 have an edit distance of 0 (using [4 3 1 2] for Group 5). In this example, the data processing system 110 clusters together Groups 4 and 5 together, since they have the smallest distance under this measure.

Sufficiently similar content items can be defined as belonging to the same cluster, or a cluster can be defined as including the sufficiently similar content items. For example, content items in the group identified by the data processing system 110 can be arranged into subgroups or clusters of similar items by the content clustering module 135. In one implementation, the content clustering module 135 can create clusters based on an evaluation of the nearest neighbor lists for each item in the group. In one implementation, the content clustering module 135 can compare each nearest neighbor list to all other nearest neighbor lists. The two items having the most similar nearest neighbor lists can then be grouped into a cluster by the content clustering module 135. In another implementation, the content clustering module 135 can group items into a cluster if a measure of similarity between their nearest neighbor lists exceeds a predetermined threshold. The content clustering module 135 can also exclude an item from a cluster. For example, the data processing system 110 can determine that a first content item lacks sufficient similarity to a second content item to be included in a cluster that includes the second content item.

The degree of relatedness of items in the group can be based on any measure of similarity. For example, intermediate clusters can be compared by measuring the distance between the centroids of the clusters, the shortest distance from a content item of one cluster to the nearest content item of another cluster, or the longest distance from a content item of one cluster to the nearest content item of another cluster. In some implementations, the content clustering module 135 can use a machine learning technique, such as a modified version of hierarchical agglomerative clustering, to determine the clusters.

The clustering process can be iterated any number of times by the content clustering module 135. In some implementations, an intermediate cluster of two or more items can be selected for further clustering by the content clustering module 135, and the process can iterate until the number of items (i.e. clusters and individual items) in the group has been reduced to a determined size. In other implementations, the clustering process continues until the final clusters reflect the behaviors of users of computing device 120 relative to the interest topics. The clusters of content items can then be used by the data processing system 110 to identify content to deliver to the computing device 120, based for example on the interests of the user.

The activity of users on the content network 105 can be maintained in an anonymous fashion so that individuals cannot be identified from the user activity. Furthermore, the user activity information can be collected on an opt-in basis, and users can opt out of the collection of their user activity information. The user can be represented identifiers associated with a computing device, for example using a cookie without regard to the actual identity of the individual person using the computing device 120.

Figure 2:
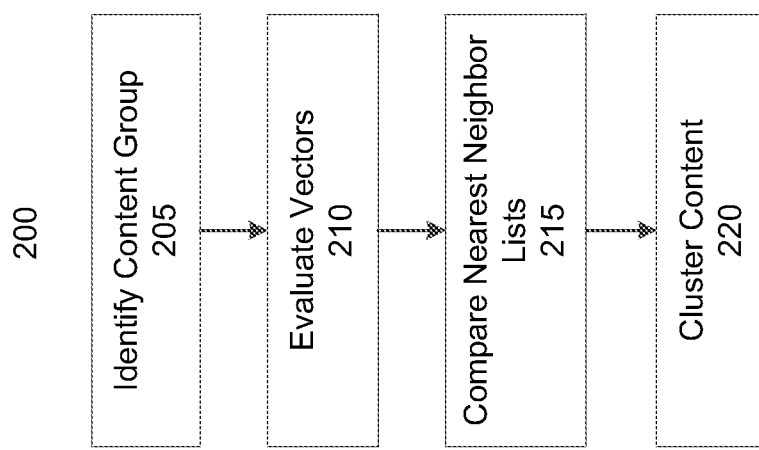
FIG. 2 is a flow chart of a method of evaluating information via a computer network, according to an illustrative implementation.

FIG. 2 illustrates a flow diagram depicting a method 200 of evaluating content via a computer network. The method 200 can identify a content group (BLOCK 205). In one implementation, a data processing system identifies the group. Each item of the content group can have a vector indicating at least one user interest category of users exposed to the item. In some implementations, the data processing system can create a vector for each of the content items in the group. For example, the data processing system can examine user activity on the computer network and can determine the interests of users who viewed a particular content item. The vector for the item can then be created or updated based on the interests associated with the items and their relative weights (i.e. how strongly the interest is associated with the item, as measured by the number of users expressing the interest). The data processing system can create such a vector for any number of content items, and can then identify a group of items to be clustered.

The method 200 can evaluate the vectors of each item in the content group to generate a nearest neighbor list for each item (BLOCK 210). A nearest neighbor list for a particular content item can be a list of all of the other items in the group sorted in order of their relatedness to the first item. The data processing system can determine a degree of relatedness for two items by comparing the vectors for the items. For example, the data processing system can determine that two items have a high degree of similarity based on the close similarity of their vectors. Close similarity of a first item to a second item can result in the data processing system assigning the second item to a relatively small index in the nearest neighbor list of the first item. The data processing system can compare each vector to the vectors of other content items and can generate a nearest neighbor list based on the comparison.

The method 200 can compare the nearest neighbor list of one item of a content group to the nearest neighbor list of a second item of the content group (BLOCK 215). In some implementations, the data processing system can make the comparison based on the similarity of the nearest neighbor lists. Similarity can be measured by using an edit distance operation, measuring the distance between the centroids of each item, or by other similarity or distance measurement techniques.

Based on the results of comparing (BLOCK 215) the nearest neighbor lists, the method 200 can associate the content items of the group into clusters (BLOCK 220). In some implementations, the data processing system can use a modified version of a clustering algorithm such as hierarchical agglomerative clustering. The nearest neighbor lists can be compared (BLOCK 215), and the data processing system can create a cluster containing the two most closely related content items. In another implementation, at least two items can be clustered if their nearest neighbor lists exceed an identified threshold of similarity. The data processing system can exclude an item from a cluster if it is determined that the item is not sufficiently similar to the cluster.

A newly formed cluster can then be eligible for further clustering with the other items in the group. For example, the data processing system can iterate the clustering process until the total number of items in the group (i.e. clusters and individual content items) is sufficiently reduced. The clusters can then be used to direct relevant content to users of the computer network based on their likely interests.

Figure 3:
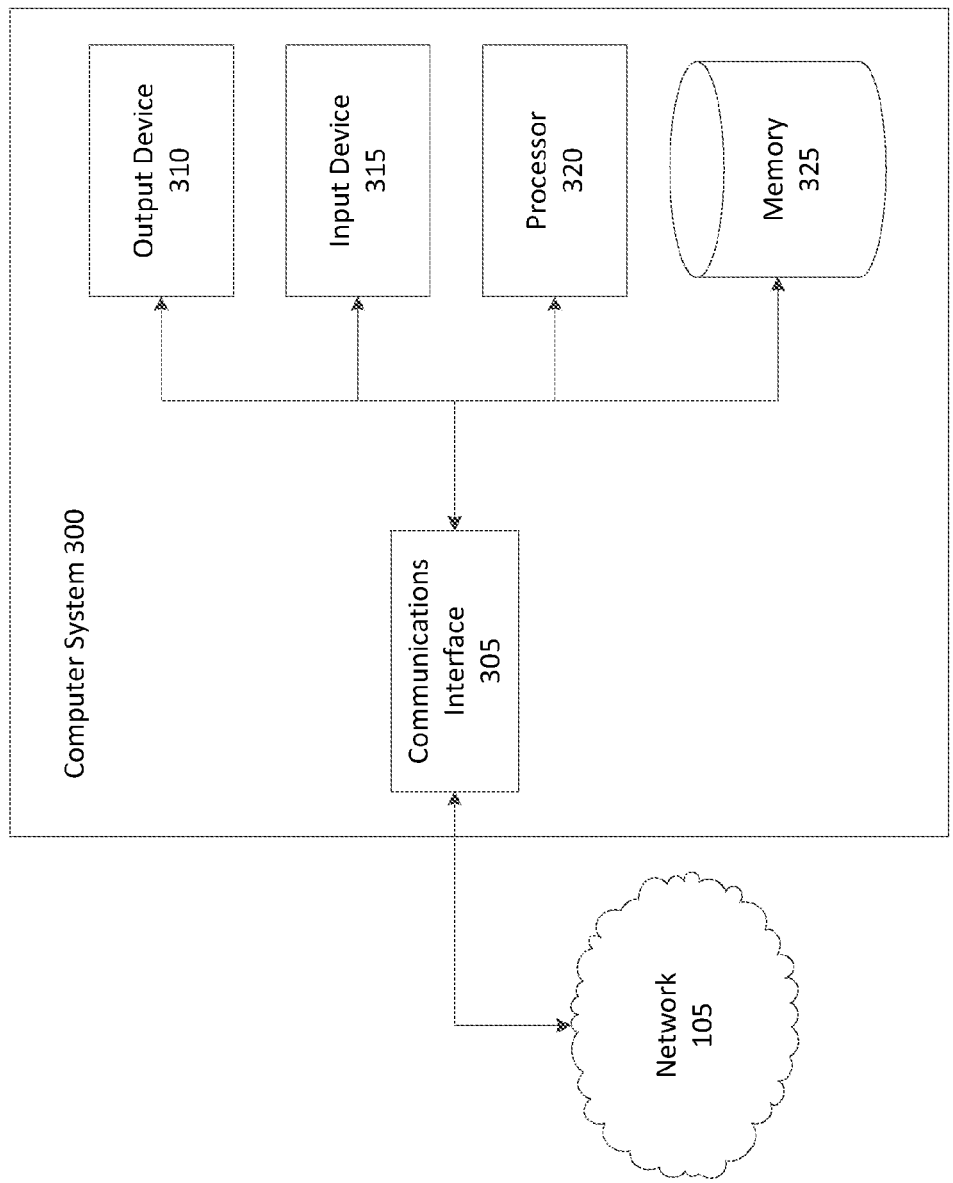
FIG. 3 is a block diagram illustrating a general architecture for a computer system that may be employed to implement various elements of the systems and methods described and illustrated herein, according to an illustrative implementation.

FIG. 3 shows the general architecture of an illustrative computer system 300 that may be employed to implement any of the computer systems discussed herein (including the system 100 of FIG. 1 and its components such as the vector generation module 130, the content clustering module 135, and the database 140) in accordance with some implementations. The computer system 300 can be used to evaluate content items and create clusters to facilitate the delivery of relevant content to users of the computer network 105 of FIG. 1. The computer system 300 of FIG. 3 comprises one or more processors 320 communicatively coupled to memory unit 325, one or more communications interfaces 305, and one or more output devices 310 (e.g., one or more display units) and one or more input devices 315. The processors 320 can be included in the data processing system 110 of FIG. 1 or the other components of the system 100 such as the vector generation module 130 and the content clustering module 135.

In the computer system 300 of FIG. 3, the memory unit 325 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the vector generation module 130 and the content clustering module 135 can include the memory unit 325 to store the content items received from content provider 115. The memory unit 325 can also include the database 140. The processor(s) 320 shown in FIG. 3 may be used to execute instructions stored in the memory unit 325 and, in so doing, also may read from or write to the memory various information processed and or generated pursuant to execution of the instructions.

The processor 320 of the computer system 300 shown in FIG. 3 also may be communicatively coupled to or control the communications interface(s) 305 to transmit or receive various information pursuant to execution of instructions. For example, the communications interface(s) 305 may be coupled to a wired or wireless network, bus, or other communication means and may therefore allow the computer system 300 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 300. Examples of communications interfaces 305 include user interfaces (e.g., web pages) having content (e.g., advertisements) selected by the content placement circuit 115 and provided by the content provider 125 for placement on the web pages.

The output devices 310 of the computer system 300 shown in FIG. 3 may be provided, for example, to allow various information to be viewed or otherwise perceived in connection with execution of the instructions. The input device(s) 315 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided at the conclusion of this disclosure.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content placement circuit 115 and the source allocation circuit 130 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 300 or system 100 can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the vector generation module 130 and the content clustering module 135 can be a single module, a logic device having one or more processing circuits, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, in one implementation, the vector generation module 130 generates exactly one vector for each ad or other content item in a content group, and the one vector can indicate more than one user interest category of the population of users (or computing devices 120) that clicked, viewed, displayed, searched for, or accessed the content item. In another example, the vector can be part of a histogram that indicates at least one user interest category, or a level of interest (e.g. strength) of at least one user interest category. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of evaluating information via a computer network, comprising:
identifying, by a data processing system, a first content group comprising one or more content items, each content item of the first content group having an interest category vector indicating at least one user interest category of users exposed to the content item;
evaluating, by the data processing system, the interest category vector of a content item of the first content group in conjunction with an interest category vector of a content item of each of a plurality of other content groups to calculate a plurality of first distance metrics, each first distance metric indicating a similarity between the first content group and one of the other content groups;
generating, by the data processing system, a first nearest neighbor list of the first content group, the first nearest neighbor list comprising a ranking of the other content groups based on the calculated first distance metrics;
comparing the first nearest neighbor list of the first content group with a second nearest neighbor list of a second content group to calculate a second distance metric indicating a similarity between the first nearest neighbor list and the second nearest neighbor list; and
based on the calculated second distance metric, combining the first content group with the second content group in a cluster that replaces the first and second content groups.

2. The method of claim 1, further comprising:
evaluating the interest category vector of each content item of the first content group to generate a nearest neighbor list of each content item of the first content group; and
generating the first nearest neighbor list of the first content group based at least in part on the nearest neighbor list for each content item of the first content group.

3. The method of claim 1, further comprising:
identifying a plurality of users who accessed at least one content item of the first content group;
determining user interest categories of the plurality of users; and
generating an interest category vector of the at least one item of the first content group accessed by the plurality of users based on an evaluation of the user interest categories of the plurality of users.

4. The method of claim 1, further comprising:
determining an edit distance between the first nearest neighbor list of the first content group and the second nearest neighbor list of the second content group; and
associating the first content group with the second content group in the cluster based on the edit distance.

5. The method of claim 1, further comprising:
evaluating the interest category vector of each content item of the first content group to determine at least one degree of similarity between each content item of the first content group.

6. The method of claim 5, wherein the first nearest neighbor list orders a first content item of the first content group relative to a second content item of the first content group based on the degree of similarity of the first content item with the second content item.

7. The method of claim 1, further comprising:
identifying a group of users as having accessed a first content item of the first content group;
obtaining a plurality of user interest categories of the group of users; and
determining a first interest category vector of the first content item based on the plurality of user interest categories.

8. The method of claim 7, further comprising at least one of:
determining that a user of the group of users clicked on the first content item; and
determining that the first content item was rendered for display on a computing device associated with the user of the group of users.

9. The method of claim 1, further comprising:
comparing the first nearest neighbor list with a third nearest neighbor list of a third content group;
based on a result of the comparison, excluding the third content group from the cluster.

10. A system of evaluating information via a computer network, comprising:
a data processing system having at least one of a memory unit configured to store processor executable instructions and a processor configured to execute the processor executable instructions to:
identify a first content group comprising one or more content items, each content item of the first content group having an interest category vector indicating at least one user interest category of users exposed to the content item;
evaluate the interest category vector of a content item of the first content group in conjunction with an interest category vector of a content item of each of a plurality of other content groups to calculate a plurality of first distance metrics, each first distance metric indicating a similarity between the first content group and one of the other content groups;
generate a first nearest neighbor list of the first content group, the first nearest neighbor list comprising a ranking of the other content groups based on the calculated first distance metrics;
compare the first nearest neighbor list of the first content group with a second nearest neighbor list of a second content group to calculate a second distance metric indicating a similarity between the first nearest neighbor list and the second nearest neighbor list; and
combine the first content group with the second content group in a cluster that replaces the first and second content groups based on the calculated second distance metric.

11. The system of claim 10, wherein the data processing system is further configured to:
identify a plurality of users who accessed at least one content item of the first content group;
determine user interest categories of the plurality of users; and
generate an interest category vector of the at least one content item of the first content group accessed by the plurality of users based on an evaluation of the user interest categories of the plurality of users.

12. The system of claim 10, wherein the data processing system further configured to:
determine an edit distance between the first nearest neighbor list of the first content group and the second nearest neighbor list of the second content group; and associate the first content group with the second content group based on the edit distance.

13. The system of claim 10, wherein the data processing system is further configured to:

evaluate the interest category vector of each content item of the first content group to determine at least one degree of similarity between each content item of the first content group.

14. The system of claim 13, wherein the first nearest neighbor list orders a first content item of the first content group relative to a second content item of the first content group based on the degree of similarity of the first content item with the second content item.

15. The system of claim 10, wherein the data processing system is further configured to:

identify a group of users as having accessed a first content item of the first content group;

obtain a plurality of user interest categories of the group of users; and determine a first interest category vector of the first content item based on the plurality of user interest categories.

16. The system of claim 15, further comprising at least one of:

the data processing system configured to determine that a user of the group of users clicked on the first content item; and the data processing system configured to determine that the first content item was rendered for display on a computing device associated with the user of the group of users.

17. The system of claim 10, wherein the data processing system is further configured to:

compare the first nearest neighbor list with a third nearest neighbor list of a third content group;

exclude the third content group from the cluster based on a result of the comparison.

18. A computer readable storage medium having instructions encoded thereon that when executed by at least one processor cause the at least one processor to perform a method to evaluate information obtained via a computer network, the method comprising:

identifying a first content group comprising one or more content items, each content item of the first content group having an interest category vector indicating at least one user interest category of users exposed to the content item;

evaluating the interest category vector of a content item of the first content group in conjunction with an interest category vector of a content item of each of a plurality of other content groups to calculate a plurality of first distance metrics, each first distance metric indicating a similarity between the first content group and one of the other content groups;

generating a first nearest neighbor list of the first content group, the first nearest neighbor list comprising a ranking of the other content groups based on the calculated first distance metrics;

comparing the first nearest neighbor list of the first content group with a second nearest neighbor list of a second content group to calculate a second distance metric indicating a similarity between the first nearest neighbor list and the second nearest neighbor list; and combining the first content group with the second content group in a cluster that replaces the first and second content groups based on the calculated second distance metric.

19. The computer readable storage medium of claim 18, wherein the method further comprises:

identifying a plurality of users who accessed at least one content item of the first content group;

determining user interest categories of the plurality of users; and generating an interest category vector of the at least one content item of the first content group accessed by the plurality of users based on an evaluation of the user interest categories of the plurality of users.

20. The computer readable storage medium of claim 18, wherein the method further comprises:

evaluating the interest category vector of each content item of the first content group to determine at least one degree of similarity between each content item of the first content group.

* * * * *